US007582329B2

(12) United States Patent
Schmitz et al.

(10) Patent No.: US 7,582,329 B2
(45) Date of Patent: Sep. 1, 2009

(54) FUEL CELL SYSTEM IN THE FORM OF A PRINTED CIRCUIT BOARD

(75) Inventors: Andreas Schmitz, Fuerfeld (DE);
Christopher Hebling, Freiburg (DE);
Robert Hahn, Berlin (DE); Bruno Burger, Huefingen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 724 days.

(21) Appl. No.: 10/510,888

(22) PCT Filed: Apr. 11, 2003

(86) PCT No.: PCT/EP03/03772

§ 371 (c)(1),
(2), (4) Date: May 27, 2005

(87) PCT Pub. No.: WO03/085760

PCT Pub. Date: Oct. 16, 2003

(65) Prior Publication Data

US 2005/0202297 A1    Sep. 15, 2005

(30) Foreign Application Priority Data

Apr. 11, 2002   (DE)   ................... 102 17 034

(51) Int. Cl.
  *H01M 8/10*   (2006.01)
  *H01M 8/02*   (2006.01)
(52) U.S. Cl. .................. 427/115; 429/34; 429/38
(58) Field of Classification Search ............ 429/32, 429/34, 38; 427/115; 204/192.15, 192.3
See application file for complete search history.

(56) References Cited

U.S. PATENT DOCUMENTS

| 4,867,857 A | * | 9/1989 | von Benda et al. ......... 427/347 |
| 5,863,671 A | * | 1/1999 | Spear et al. ................ 429/12 |

(Continued)

FOREIGN PATENT DOCUMENTS

DE   195 02 391 C1   5/1996

(Continued)

OTHER PUBLICATIONS

International Search Report for WO 2003/085760 (PCT/EP03/03772).

(Continued)

*Primary Examiner*—Gregg Cantelmo
(74) *Attorney, Agent, or Firm*—Marshall & Melhorn, LLC

(57) ABSTRACT

A planar fuel cell system comprising at least two fuel cells which are electrically connected in series in a plane via horizontally overlapping connecting lugs and comprise an anode current collector on the anode side and comprise a cathode current collector on the cathode side is provided. The current collectors are electrically connected to the connecting lugs and a polymer electrolyte membrane, wherein the current path is led around the polymer electrolyte membrane. The fuel cell system is designed with a printed circuit board technique and as a composite of a first, anode-side printed circuit board and a second, cathode-side printed circuit board, and the current collectors and connecting lugs are designed as strip conductors of these printed circuit boards. Methods of manufacturing the fuel cell system are also provided.

22 Claims, 10 Drawing Sheets

U.S. PATENT DOCUMENTS

| | | | |
|---|---|---|---|
| 5,863,672 A * | 1/1999 | Ledjeff et al. | 429/26 |
| 5,989,741 A * | 11/1999 | Bloomfield et al. | 429/32 |
| 6,127,058 A * | 10/2000 | Pratt et al. | 429/30 |
| 6,399,232 B1 * | 6/2002 | Eshraghi | 429/27 |
| 6,541,147 B1 * | 4/2003 | McLean et al. | 429/35 |
| 7,323,266 B2 * | 1/2008 | Morishima et al. | 429/30 |
| 2003/0044672 A1 * | 3/2003 | Fukumoto et al. | 429/40 |
| 2004/0115498 A1 * | 6/2004 | McDonald et al. | 429/30 |
| 2004/0142227 A1 * | 7/2004 | Sugai et al. | 429/38 |
| 2004/0175606 A1 * | 9/2004 | Komura et al. | 429/34 |
| 2004/0224190 A1 * | 11/2004 | Sasahara et al. | 429/12 |

FOREIGN PATENT DOCUMENTS

| | | |
|---|---|---|
| DE | 197 08 472 A1 | 9/1998 |
| DE | 198 33 064 A1 | 2/2000 |
| DE | 199 26 025 A1 | 11/2000 |
| WO | WO 96/18217 A1 | 6/1996 |
| WO | WO 98/31062 A1 | 7/1998 |

OTHER PUBLICATIONS

S.J.C. Cleghorn et al., A printed circuit board approach to measuring current distribution in a fuel cell, Journal of Applied Electrochemistry, 1998, 663-627, 28, Chapman & Hall.

* cited by examiner

FUEL CELL SYSTEM IN THE FORM OF A PRINTED CIRCUIT BOARD

This application is the U.S. national phase of international patent application PCT/EP03/03772, filed on Apr. 11, 2003, and claims priority to German patent application number 102 17 034.7, filed Apr. 11, 2002, all of which are hereby incorporated by reference.

The invention relates to a planar fuel cell system with which at least two fuel cells are arranged in a plane and are electrically connected in series via connecting lugs which overlap horizontally, wherein the current path running the fuel cell system is led around the polymer electrolyte membrane contained in the fuel cell system, so that the membrane is not penetrated. The invention further relates to a method for manufacturing such a fuel cell system.

BACKGROUND OF THE INVENTION

For the addition of the individual voltages of fuel cells and achieving a higher total voltage which this entails, it is known to connect several fuel cells electrically in series. Evidently then, for this, several fuel cells are connected together in a fuel cell system.

Usually for this, several fuel cells are arranged above one another and are pressed together by two end plates by way of screw connections (stack design). However, with regard to the geometry of the fuel cell system, a large constructional height and an unfavourable ratio of the edge length of the fuel cell system result on account of this design.

Since, for many applications, it is desirable to realise a fuel cell system with a significantly flatter geometry, there exists the need to connect the fuel cells in a fuel cell system in series in a plane. Here there are various ideas known from the state of the art:

The patent document DE 195 02 391 C1 and the PCT published application document WO 96/18217 disclose so-called "strip membrane fuel cells" with which the fuel cells are arranged next to one another and are connected to one another in series. The series connection is realised here in a manner such that a traverse conducting structure connects the cathode side of a fuel cell to the anode side of a further fuel cell and at the same time penetrates through the membrane contained in the fuel cells. With this, there exists the disadvantage that leakages may easily occur due to the passage of the transverse conductor through the membrane.

The U.S. Pat. No. 6,127,058 discloses a fuel cell system with which the fuel cells are arranged in a plane and are connected in series by way of outer-lying connecting lugs. With this solution, although the current path does not penetrate the membrane, the technical manufacturing expense is very active and prone to breakdown on account of the design, particularly with regard to the individual large-scale manufacture. Furthermore, it is considerably disadvantageous that at least two parts to be assembled individually as current dischargers are required for each cell.

In S. J. C Cleghorn et al.: "A printed circuit board approach to measuring current distribution in a fuel cell", Journal of Applied Electrochemistry 28 (1998) 663-627, the idea of measuring the current distribution of a fuel cell by way of using a fuel cell whose current collector and gas distribution structure (flow field) on the anode side has been realised in a construction manner of a [printed] circuit board and in a segmented manner is described. The construction described here however is only suitable for locally resolved diagnosis purposes in the experimental field. Here too there is no series connection since for these diagnosis and measurement purposes (current, voltage, impedance spectroscopy) only individual cell segments are tapped.

It is the object of the present invention to specify a fuel cell system which has a low technical expense and may be manufactured economically in industrial large-scale manufacture, which is robust in its field of application and may be applied in a manner which is particularly technically simple, which has a flat geometry and which delivers an increased output voltage with respect to fuel cells contained in the fuel cell system. Furthermore, the disadvantages of the mentioned state of the art are to be avoided.

It is further the object of the invention to specify a method for manufacturing such a fuel cell system.

This object preferbly is achieved by the characterizing features of the present invention.

BRIEF SUMMARY OF THE INVENTION

By way of the fact that the fuel cell system is constructed with [printed] circuit board techniques, one applies reliable series production manufacturing technology in order to economically manufacture a fuel cell system with a low electrical output in large-scale manufacture. This relates also and in particular to the contacting between the fuel cells which are contained in the fuel cell system and are connected to one another in series, which are realised with tried and tested methods of [printed] circuit board technology.

By way of the fact that the fuel cell system is designed as a composite of a first, anode-side printed circuit board and of a second, cathode-side printed circuit board, on the one hand the number of different components which are to be produced during manufacture of such a system is reduced and thus the manufacturing is simplified, and on the other hand it is rendered possible to construct electronic circuits on the printed circuit board composite. These may possibly obtain the energy for the operation of the circuit from the fuel cell system itself.

According to the character of the realisation of the fuel cell system according to the invention in printed circuit board technology, current collectors which are required for the electron transport in the fuel cell, and connecting lugs via which the fuel cells contained in the fuel cell systems are connected to one another in series in a plane, are realised as strip conductors of the printed circuit boards from which the printed circuit board composite is constructed.

Within the context of this application, a printed circuit board in printed circuit board technology indicates a board, consisting of a printed circuit board carrier (substrate) with a deposited metallisation, wherein usually parts of the metallisation are removed, e.g. by way of an etching method or by way of milling, so that the remaining metallisation part forms an electrically conductive strip conductor. Such metallisations or strip conductors may be located on the first and/or second side of a printed circuit board.

By way of the fact that current collectors as well as connecting lugs are designed as strip conductors, these are spatially integrated into the fuel cell system in a mechanically robust and furthermore space-saving manner. Furthermore it is also advantageously rendered possible to permit the current collector to merge into the connecting lugs in a smooth manner by way of using the same metallisation layer for realising the respective strip conductor.

Advantageous embodiments and further developments of the solution will be apparent from the description of the invention provided herein.

The fuel cell system may advantageously be developed further to the extent that the connecting lugs are located within the boundary of the printed circuit board composite, thus the connecting lugs do not project beyond the outline of the printed circuit board composite. The mechanical robustness may thus be further improved and the expense with regard to technology may be reduced further with its practical application and with the further processing.

If the fuel cell system is advantageously developed further to the extent that the horizontally overlapping connecting lugs in their overlapping region in each case are connected by way of at least one contacting element, the connecting lugs are well defined with regard to one another and are brought into connection with one another in a lasting manner and thus the electrical series connection is realised in a manner in accordance with printed circuit board construction. The contacting element is particularly advantageous when it is used in combination with the advantageous further development of the fuel cells in each case having a reaction region incorporated into the printed circuit-board, said reaction region being bordered by a raised part of printed circuit board material and/or lacquer, since then, on account of the perpendicular contacting elements, the arising vertical distance between the overlapping connecting lugs of two fuel cells contained in the fuel cell system is bridged. The contacting element may advantageously be realised with a perpendicular design. It is however not limited to such a design.

A practical possibility for realising such a perpendicular contacting element lies in designing it as a bore which is completely or partly filled with an electrically conductive material, for example with solder or electrically conductive adhesive.

One advantageous further embodiment lies in additionally leading an electrically conductive linear element (wire, nail or bolt) through the bore, wherein the electrical contact between the connecting lug and the conductive, linear element is realised by way of conductive material filled into the intermediate space lying therebetween.

The bore on its inner side may be advantageously metallised, by which means the contacting is further improved, and the liquid solder, encouraged by the capillary forces, may flow into the bore. This may preferably be realised by way of a galvanically grown metal layer, wherein copper is preferably used.

It is also possible to design the perpendicular contacting element without filling with electrically conductive material and only with the metallisation of the inner side of the bore.

It is further advantageous to provide several contactings for each connection of two overlapping connecting lugs, by which means the respective transition resistance is reduced further. An alternative, advantageous perpendicular contacting element is a rivet or press pin which additionally also contributes to the mechanical strength with respect to the cohesion of the composite of the printed circuit boards.

The contacting element, given connecting lugs lying directly on one another, or given an only small distance between these, may be realised by way of point welding (laser or resistance welding), wherein the strip conductor at least of one side (cathode-side or anode-side) must be accessible from the outside for the welding.

A further realisation possibility of the contacting element lies in doing without the bores and filling the intermediate region of the overlapping connecting lugs with a conductive adhesive or conductive lacquer. One advantageous further design of this embodiment lies in incorporating a sheet metal piece or a metal foil in the intermediate region of the connecting lugs which the conductive adhesive surrounds.

Advantageously, gas distributor structures may be incorporated into the first anode-side printed circuit board and into the second cathode-side printed circuit board, wherein the second, cathode-side printed circuit board additionally or in place of the gas distributor structures may comprise air openings to the outside of the fuel cell system.

If the fuel cells of the fuel cell system in each case comprise a reaction region incorporated into the printed circuit board, which is bordered by a raised part of printed circuit board material and/or lacquer defining the reaction region, then a pocket arises on account of this which defines the reaction region and furthermore renders possible an improved fixation and an improved assembly of the diffusion layer in the reaction region, as is provided for in a further advantageous embodiment.

In this further advantageous embodiment, in the reaction region in which a diffusion layer is provided, there is also contained a gas distributor structure and a current collector, and the diffusion layer is deposited onto the current collector in a flat manner. The diffusion layer at the same time may be electrically contacted with the metal layer of the current collector by way of soldering or an electrically conductive adhesive, and may also be mechanically fastened.

The raised part of printed circuit board material and/or lacquer may in a practically particularly advantageous form be an interconnected frame structure, wherein the applied material may be plastic, FR4, impregnated paper or similar material which are laminated on or bonded on, epoxy adhesive which is printed on, or furthermore solder blocking lacquer.

The diffusion layer may be a carbon fibre paper or may be designed in a particularly advantageous manner as a metallised plastic fabric, and specifically in a manner such that it is the case of a plastic fabric which preferably only in the region of the electrodes has metallised segments, e.g. gold (nickel-gold). Suitable plastic fabrics of polyamide or nylon with diameters of the threads in the region of 20 and 100 µm and mesh widths of 30 to 500 µm are used as screen-printing fabric. A metallic segmentation may at the same time be achieved by way of prior masking or photolithography of the plastic fabric.

For avoiding corrosion, it is advantageous to provide the strip conductors consisting for example of copper with single-ply or multi-ply, electrically conductive and resistant coatings, such as nickel-gold, Cr or TiW.

The strip conductors, as also the remaining metallisations, within the framework of the whole invention, may consist of copper, nickel, to gold or stainless steel and/or alloys thereof.

For separating off the anode side from the cathode side in each case of one reaction space which is realised by a first, anode-side and an analogously constructed second, cathode-side printed circuit board, for the composite of the two printed circuit boards, a proton-conductive polymer membrane is applied between these printed circuit boards which only has catalytically coated segments in the region of the reaction spaces of the fuel cells in the fuel cell system. At the same time, preferably a segmented membrane electrode assembly (MEA) is used. With this, this membrane is not penetrated by the current path, i.e. by the strip-conductor-like current collectors and connecting lugs or by the perpendicular connection elements which connect the horizontally overlapping connecting lugs of two fuel cells.

Hereinafter the advantages of the invention with regard to the manufacturing method of a fuel cell system according to the invention are described:

By way of the fact that a first and a second printed circuit board carrier (substrate) in each case is selected with an upper side and a lower side and for both carriers (substrates) a number of equal method steps is carried out in each case on the upper side, one may reduce the expense for manufacture with industrial large-scale production. This is accomplished by way of manufacturing several fuel cell systems from a singe printed circuit board (multiple use).

By way of the fact that the printed circuit board carrier (substrate) in each case is provided with a metallisation so that a printed circuit board within the context of the present invention arises, and by way of the fact that this metallisation is selectively etched away in part regions of the printed circuit board so that strip conductors arise, in a reliable manner capable of series production, current collectors realised as a strip conductors and likewise strip-conductor-like connecting lugs which are contiguous with these in a smooth manner are produced in the reaction spaces.

The connecting lugs at the same time do not necessarily have to be in the same plane as the current collectors, but may also be realised as a further strip conductor in the form of a metallisation on the lower side of the strip conductor.

By way of the fact that gas distributor structures are incorporated into the printed circuit board, the reactands are led to the reaction space and distributed here. The incorporation may for example be effected by way of milling, wherein in the case of a thin strip conductor in the reaction region (for example about 30 µm to 100 µm) one mills through the plane of the strip conductor in the direction of the printed circuit board lower side, and in the case of a thick conductor layer (e.g. 200 µm to 500 µm) one mills or etches into the strip conductor layer itself.

By way of the fact that a raised part surrounding the reaction spaces is deposited, a recess arises in each case in the region of the reaction spaces, by which means advantageously the assembly of the diffusion layers is simplified. With this assembly, an electrical and mechanical connection to the strip conductor plane and the diffusion layer may be effected by way of soldering or a conductive adhesive. The assembly may also be encouraged only by way of a pointwise mechanical connection by way of a non-conductive adhesive.

Firstly a first, and a second intermediate product arise in this manner.

By way of the fact that subsequently the membrane electrode assembly (MEA) is deposited onto the upper side of the first intermediate product and that the first and the second intermediate product are joined together with their upper sides facing one another, by way of the MEA, separated anode-side and cathode-side reaction spaces arise. The joining may be realised by way of screwing the two plates to one another outside the reaction regions, and/or bonding then to one another under pressure, by which means the contact resistance between the strip conductor and the diffusion layer as well as between the diffusion layer and the membrane electrode unit is reduced.

By way of the fact that the connecting lugs of the anode-side and cathode-side printed circuit board are connected to one another, the electrical series connection of the fuel cells contained in the fuel cell system is created.

BRIEF DESCRIPTION OF THE SEVERAL VIEWS OF THE DRAWINGS

The present invention is explained hereinafter by way of several embodiment examples with figures. There are shown in FIG. 1 the schematic construction of a fuel cell with printed circuit board technology, in a cross section, which according to the invention is designed as a composite of two printed circuit boards, FIG. 2 the schematic construction of the anode-side printed circuit board, in a plan view, FIG. 3 the schematic cross section in the region of the reaction space and of the MEA of a first embodiment form of a fuel cell system according to the invention, with three fuel cells, which are connected in series in a plane, FIG. 4 the schematic cross section in the region outside the membrane electrode assembly (MEA) through a first embodiment of a fuel cell system according to the invention, with three fuel cells, which are connected in series in a plane, FIG. 5 the schematic upper and lower view of one of the two printed circuit boards shown in FIG. 4, of the printed circuit board composite, without a deposited raised part, diffusion layer and MEA.

DETAILED DESCRIPTION OF THE INVENTION

Figure 1:
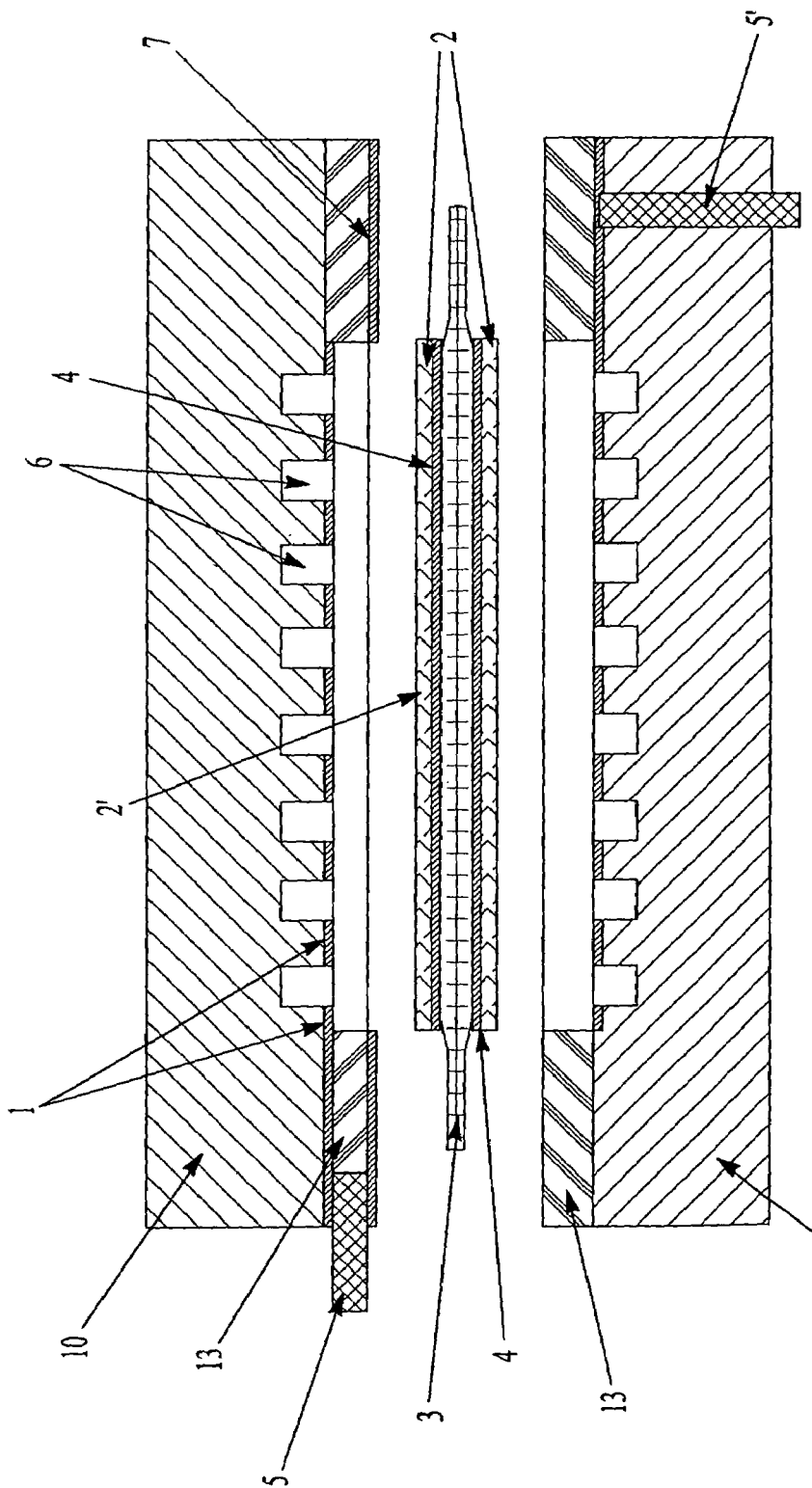

FIG. 1 shows a schematic cross section through a fuel cell with printed circuit board technology, which is designed as a composite of a first, anode-side printed circuit board 10 and a second cathode-side printed circuit board 11. The two oppositely lying printed circuit boards 10 and 11, which in this case are constructed in completely equal manner and are deposited onto one another rotated by 180° to one another about the spatial vertical, in their reaction region are separated by the membrane electrode assembly (MEA) 3 and are connected to one another at the edges. The common reaction region formed by the two printed circuit boards 10 and 11 of the printed circuit board composite at the same time consist of the gas distributor structures 6, the current-collectors 1 and the diffusion layers 2 of both printed circuit boards as well as of the previously mentioned MEA 2 with the porous catalytic coating 4.

As may be deduced from the Figure, the gas distributor structures 6 are incorporated into the printed circuit boards 10 and 11 by way of the fact that in each case the upper-lying copper strip conductor forming the current collector 1 has been penetrated. Alternatively, with thick copper strip conductors of about 200 μm to 500 μm it is possible to incorporate the gas distribution structures into the copper strip conductor itself. By way of this arrangement of the gas distributor structures, the side of the gas distributor structures which faces the MEA 3 terminals with the plane of the current collectors 1 in a flush manner. The diffusion layer 2 is deposited onto this plane over the area so that the reactants supplied via the distribution structure 6 may enter into the diffusion layer 2, and so that the diffusion layer 2 is also electrically connected to the current collectors 1.

The diffusion layer may at the same time consist of carbon-fibre paper, preferably however also may be designed as a plastic fabric 2' which in the region of the current collector 1 metallised segments (e.g. gold, nickel gold); Suitable plastic fabric of polyamide or nylon with diameters of the threads in the region between 20 μm and 100 μm and mesh widths of between 30 μm and 500 μm are used as screen printing fabric. Although methods for the permanent metallisation of such fine plastic fabrics are known, the segment structure may be achieved by way of a masking or photolithography of the plastic fabric which precede the metallisation.

In this example, advantageously the diffusion layer 2 is electrically contacted and also mechanically fastened to the current collector 1 by way of soldering or electrically conductive adhesive. In order to better fix the diffusion layers and to simplify the assembly of the diffusion layer, the diffusion layers may be surrounded by a raised part 13 of printed circuit board material, so that in each case a recess (pocket) arises in the part of the printed circuit boards 10 and 11 which forms the reaction space, and thus a frame structure is formed. This frame structure is characterised by the distance of the bonding joint 7 to the plane of the current collector 1 and by nature is located outside the reaction region. This frame structure may be realised by way of laminating-on or bonding-on plastic, FR4, impregnated paper or similar material, by way of printing-on epoxy adhesive, solder-blocking lacquer or similar means.

The strip conductors in all present embodiment examples are manufactured of copper or the other previously mentioned materials and within the reaction space of the respective fuel cell, thus where the strip conductors contact the diffusion layer, serve as current collectors. Outside the reaction spaces, the strip conductors are used for discharging the current as well as for contacting the current discharge contact 5 to the outside of the fuel cell system, as well as for forming connecting lugs, i.e. for the electrical series connection of fuel cells in the system. To avoid corrosion, the copper strip conductor is to be provided with a single-ply (single-layer) or multi-ply (multi-layer) resistant coating (e.g. nickel-gold, Cr, TiW).

The contacts 5 and 5' serve for the external electrical connection of the fuel cell system and are electrically bonded to the current collectors 1. Commercially available and standardised clamp contacts, connecting lugs, pins, rivets etc. may be used as outer contacts 5 and 5'. In FIG. 1, the attachment of a lateral outer contact 5 and alternatively to this, the attachment of a perpendicular outer contact 5' to the outer side of the printed circuit board is represented, which are connected to the strip conductor by way of soldering or riveting.

In the case of the use of methanol as a reactant, the outer side of the anode-side gas distributor is completely or partly manufactured of a gas permeable membrane or a microstructure with microscopic openings, which permits carbon-dioxide gas bubbles to be transported out of the reaction space by way of the microstructure or to be withdrawn to the outside through the microscopic openings of the microstructure.

Figure 2:
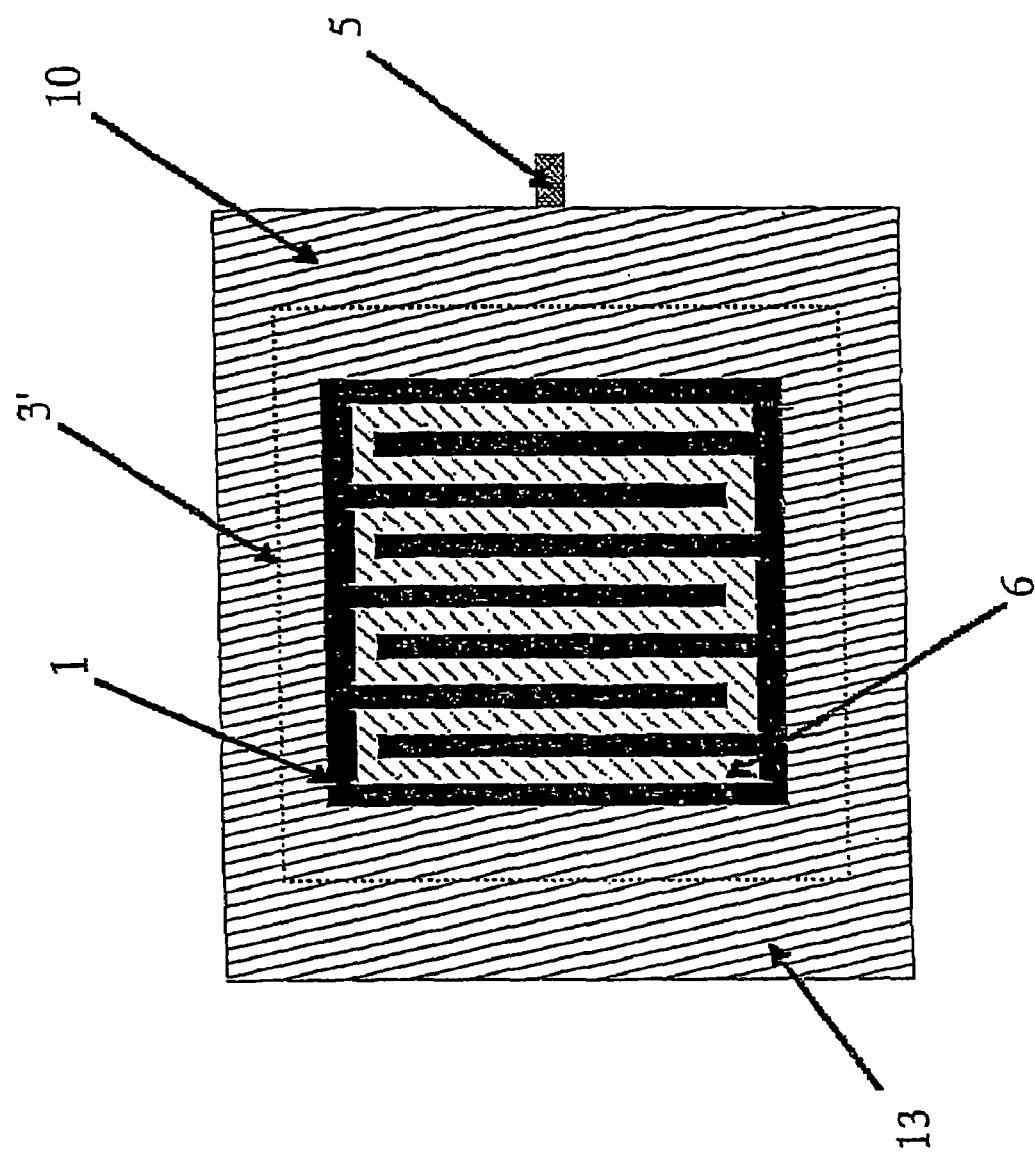

FIG. 2 shows the anode-side printed circuit board 10 of the fuel cell system of FIG. 1 in a plan view. Recesses of the gas distribution structure 6 are incorporated into the plane of the current collector 1 and the printed circuit board material lying thereunder. The membrane electrode assembly is not drawn in this representation, but its position in indicated by the dashed line 3'. In the present embodiment, the gas distribution structure has a meandering course. The mechanically deposited raised part 13 forming a frame structure and surrounding the reaction space covers the current collector 1 in the edge regions. For this reason the current collector 1 in the plan view may only be recognized in the region of the reaction space. The current collector 1 covered by the frame structure is laterally connected to the current discharge contact 5.

Figure 3:
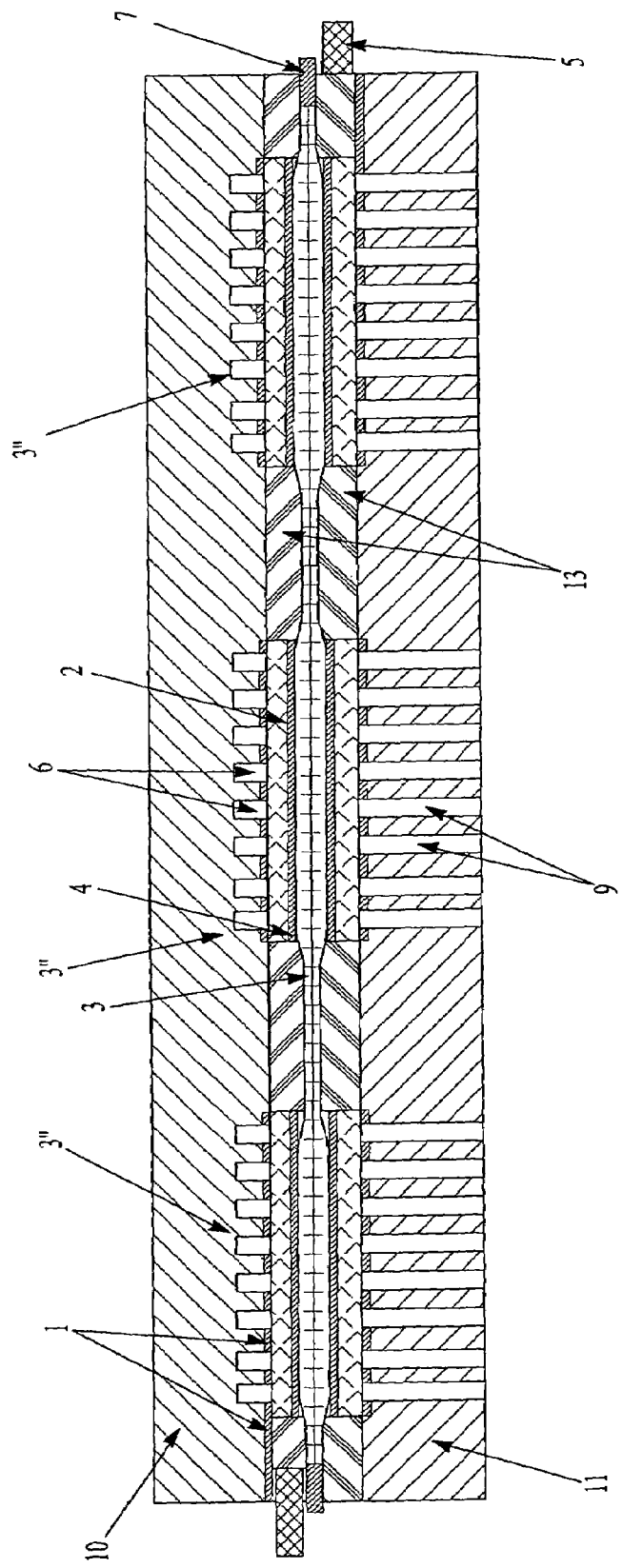

FIG. 3 shows a fuel cell system with printed circuit board technology which as a composite of an anode-side printed circuit board 10 and a cathode-side printed circuit board 11 is basically constructed analogously to the example shown in FIG. 1. Here three fuel cells are shown in a plane which are connected electrically in series outside the region of the membrane electrode unit (MEA) but within the printed circuit board composite.

Since this figure shows a cross section within the region of the reaction space, the series connection is not shown in more detail here.

The proton-conductive polymer membrane 3 is preferably designed as a segmented MEA 3" which is segmented in a manner such that the MEA 3" only has catalytically coated segments 4 in the region of the reaction spaces of the fuel cell system. The segmentation may at the same time be advantageously incorporated into an MEA which has been catalytically coated over the whole surface, such as by way of laser ablation or reactive ion etching (RIE).

Instead of a cathode-side gas distribution structure, the embodiment example has air openings 9 to the outside of the printed circuit board composite. The printed circuit boards 10 and 11 are screwed to one another or bonded under pressure, to reduce the contact resistance at the edge. Connection joints 7 arise.

The raised parts 13 forming the frame structure here, as also in the other embodiment examples, circumscribe the reaction regions.

Figure 4:
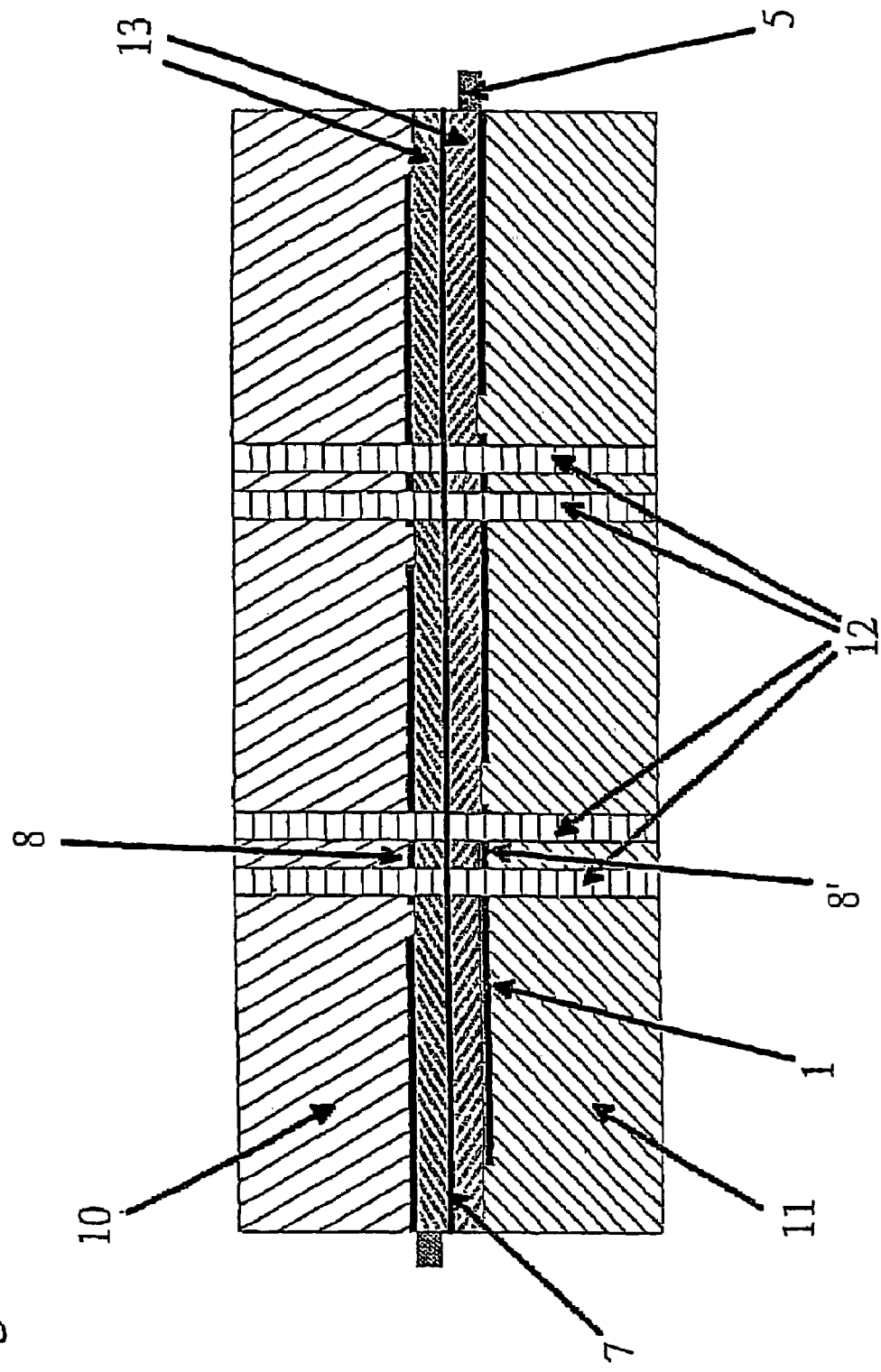

FIG. 4 shows a schematic cross section outside the MEA through a fuel cell system of three fuel cells, with printed circuit board technology. Here a preferred way of electrically connecting the fuel cells in series in a plane outside the region of the MEA is represented.

This is effected in that the copper strip conductor of the current collector 1 is led into the outside of the reaction region but permanently in the inside of the boundary of the printed circuit board composite. Thus the connecting lug 8' of the printed circuit board 11 arises. The copper strip conductor of the fuel cell in the middle in FIG. 3 is likewise led outwards whilst forming the connecting lug 8. The connecting lugs 8 and 8' lie opposite one another in the vertical direction, thus overlap in a horizontal manner. At the same time the connecting lugs 8 and 8' are connected by way of perpendicular contacting elements 12 for creating the electrical contact.

In order not to penetrate the membrane electrode assembly (MEA) 3, the strip conductor of the current collector 1 is led in the region outside the polymer membrane or MEA 3 in the form of a connecting lug 8, into the intermediate space of two adjacent fuel cell assemblies. A bore 12 is formed through the printed circuit board composite for contacting the oppositely lying strip conductor lugs 8, 8'.

The conductive connection in the form of contacting elements 12 between the connecting lugs 8 and 8' arise on account of meting the inner side of the bore 12. This is preferably realised by way of a galvanically grown copper layer. In order to further improve the contacting, the bore maybe completely or partly filled with solder or conductive adhesive. The contacting may also be realised without the inner-side metallisation of the bore only by way of the complete or partial filling of the bore with solder or conductive adhesive.

The contacting by way of a contact element 12 in the form of an electrically conductively filled bore may be advantageously varied to the extent that before joining together the printed circuit boards 10 and 11, on the reaction-space side, one drills in each case a bore with a larger diameter so that a larger surface of the connecting lugs 8 and 8' is released. Then, by way of a bore of a smaller diameter one creates a continuous bore from the opposite side, wherein the thinner bore lies coaxially in the thicker bore and the thinner bore penetrates the connecting lugs 8 and 8'. By way of filling with solder or conductive adhesive, then, as previously described, the contacting of the two connecting lugs 8 and 8' to one another may be carried out. On account of the thicker, first bore, as a whole a larger surface of the connecting lugs facing one another is released and thus an improved electrical contacting is achieved.

The particular preference of this type of contacting by way of horizontally overlapping connecting lugs 8 and 8' and perpendicular contacting elements 12 lies in not penetrating the proton-conductive polymer membrane 3 which in each case on the anode side and cathode side separates the reaction spaces from one another.

If the contacting element 12 instead of a filled bore is realised by a rivet or press pins, then simultaneously for the electrical contacting the pressing pressure of the printed circuit board composite is also realised. Furthermore, this possibility has a very low contact resistance and no temperature loading on assembly. If the printed circuit board material is removed between a connecting lug 8 and the surface of a printed circuit board 10 or 11 on the reaction region side, then a welding connection is also possible. For connecting the printed circuit boards 10 and 11, a clamping connection is alternatively or additionally conceivable.

Figure 5:
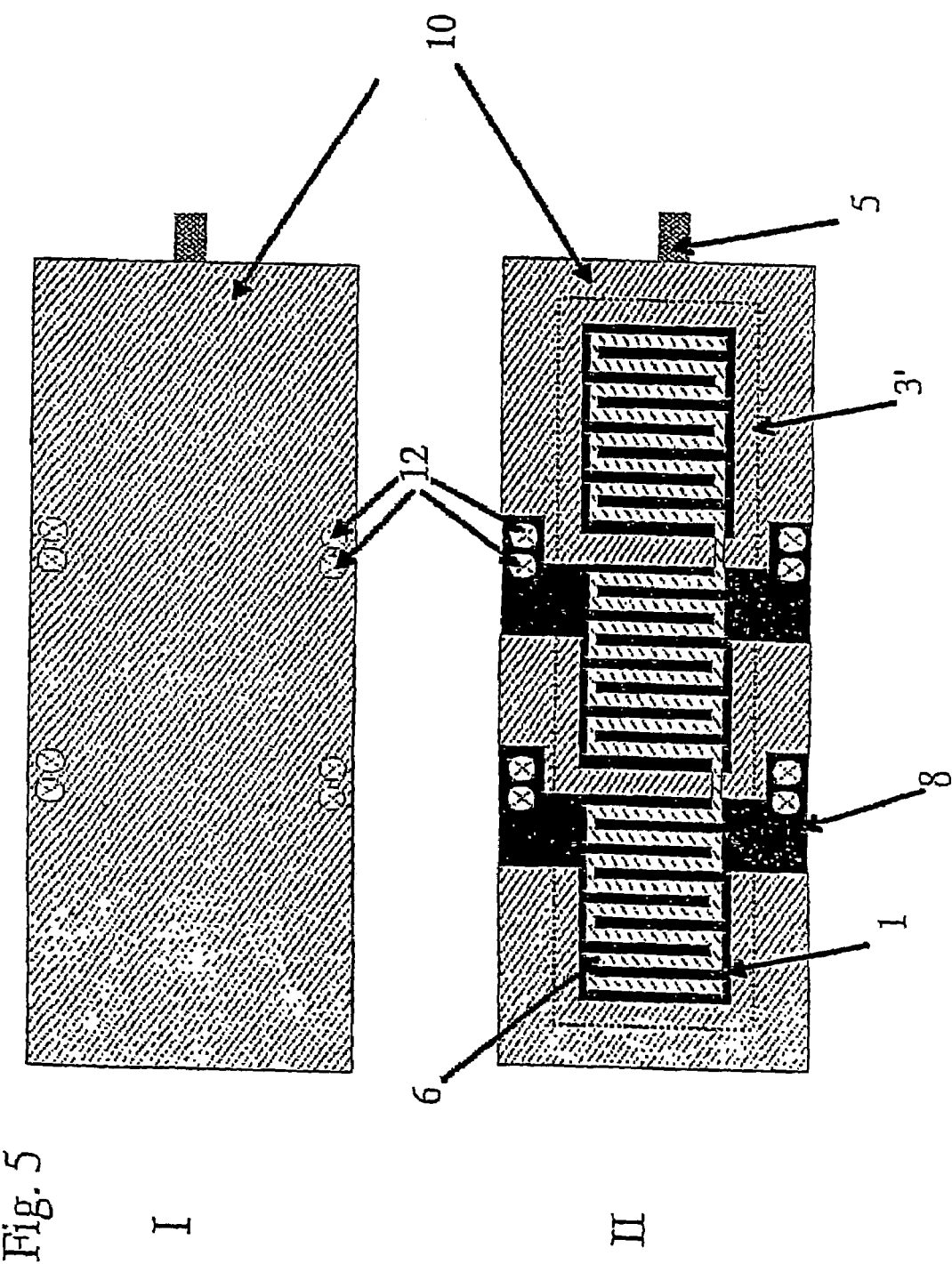

FIG. 5 shows the plan view of the surface of the printed circuit board 10, said surface lying on the reaction region side (II) and lying on the outside (I) in the printed circuit board composite, without a deposited raised part, without diffusion layers 2 and without MEA 3, wherein the position of the MEA is indicted by the dashed line 3'.

On the reaction region side (II), one may clearly recognise the serpentine structure of the gas distributor structures 6. The term "gas distributor structures" within the context of this patent application indicates all distributor structures for distributing and supplying the reactands in and to the reaction region. At the same time, the distributor structures or the reactands are not limited to those which are gaseous. Other forms are just as conceivable, such as liquid ones, like methanol.

In the view (II) on the reaction region side, the strip conductor which surrounds the serpentine gas distribution structure and forms the current collector 1 may be recognised. This strip conductor 1 merges smoothly into the connecting lugs 8, in the drawing in each case on the right at the top and on the right at the bottom of the reaction region with the gas distribution structure 6 and the current collector 1. The reaction region whose boundary in this figure is represented by the rectangle formed by the gas distribution structure 6 and the current collector 1, lies in the pocket which circumscribes this reaction region and which is formed by the raised part of printed circuit board material which is not shown in more detail in this figure. The gas distribution structure at the same time penetrates this raised part forming the pocket at the location where two fuel cells are connected to one another with regard to the supply of reactands.

The perpendicular contacting elements 12 are also shown in the figure, from the view (I) lying at the outside as well as from a view from the reaction region side (11) wherein in the latter view the penetration of the perpendicular connection elements is represented by the connecting lugs 8.

It is to be clearly seen that the electrical circuiting by way of the connecting lugs 8 takes place outside the reaction region but within the outer boundary of the printed circuit board 10. By way of this one not only achieves the advantage that on account of the electrical contacting, the MEA 3' indicated only in its position in this figure is not penetrated and by way of this leakages may not arise, but also the usually high electrical losses in a planar arrangement of series connected fuel cells is avoided by way of the fact that the current through the preferably used well-conducting copper strip conductors which are formed by the current collectors 1 and the connecting lugs 8 is discharged to the edge.

Figure 6:
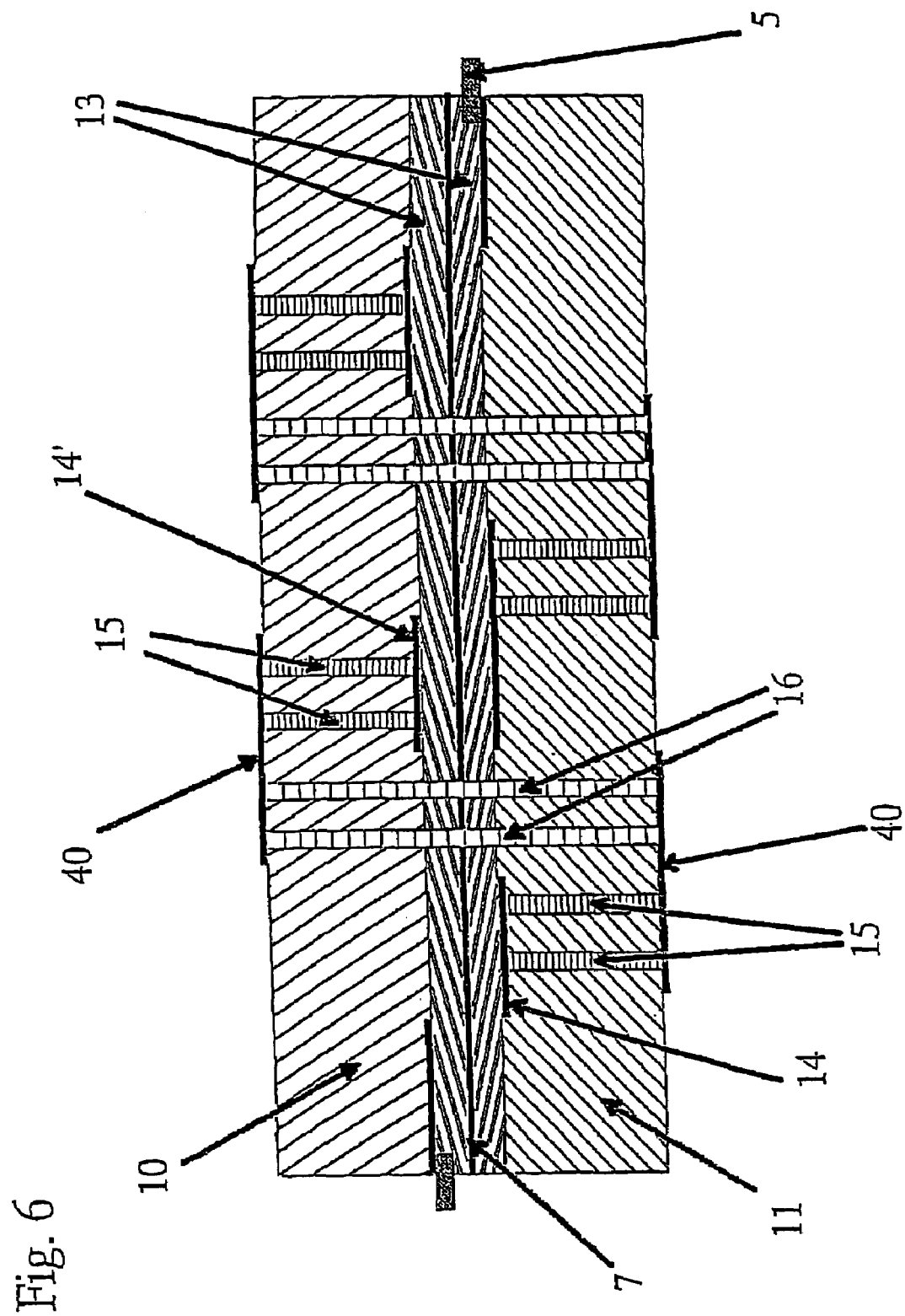
FIG. 6 the schematic cross section of a second embodiment form of the fuel cell system according to the invention, with which three fuel cells in the printed circuit board composite are not only connected electrically in series in a plane via inner-lying connecting lugs, but also via strip conductors on the surface of the printed circuit board composite, FIG. 7 the view of the upper and lower side of one of the two printed circuit boards of the printed circuit board composite in FIG. 6 without the deposited raised part, diffusion layer and without MEA, FIG. 8 the schematic cross section of a third embodiment form of the fuel cell system according to the invention, with which in the printed circuit board composite three fuel cells are connected electrically in series in a plane not only by way of inner lying connecting lugs, but also via strip conductors which are on the reaction region side and which face one another, on the respective sides, which face one another, of the anode-side and cathode-side printed circuit board, and which are welded from an opening accessible to the outside, FIG. 9 the view of the upper and lower side of one of the two printed circuit boards of the printed circuit board composite in FIG. 8, without diffusion layer and MEA, but with a deposited raised part, FIG. 10 the schematic cross section in the region of the reaction space of a fourth, alternative embodiment of the fuel cell system according to the invention, with four fuel cells whose anodes and cathodes are arranged alternately on an upper and lower printed circuit board, and are connected in series in a plane by way of connection of the current collectors of two adjacent anodes and cathodes by way of a strip conductor.
Figure 7:
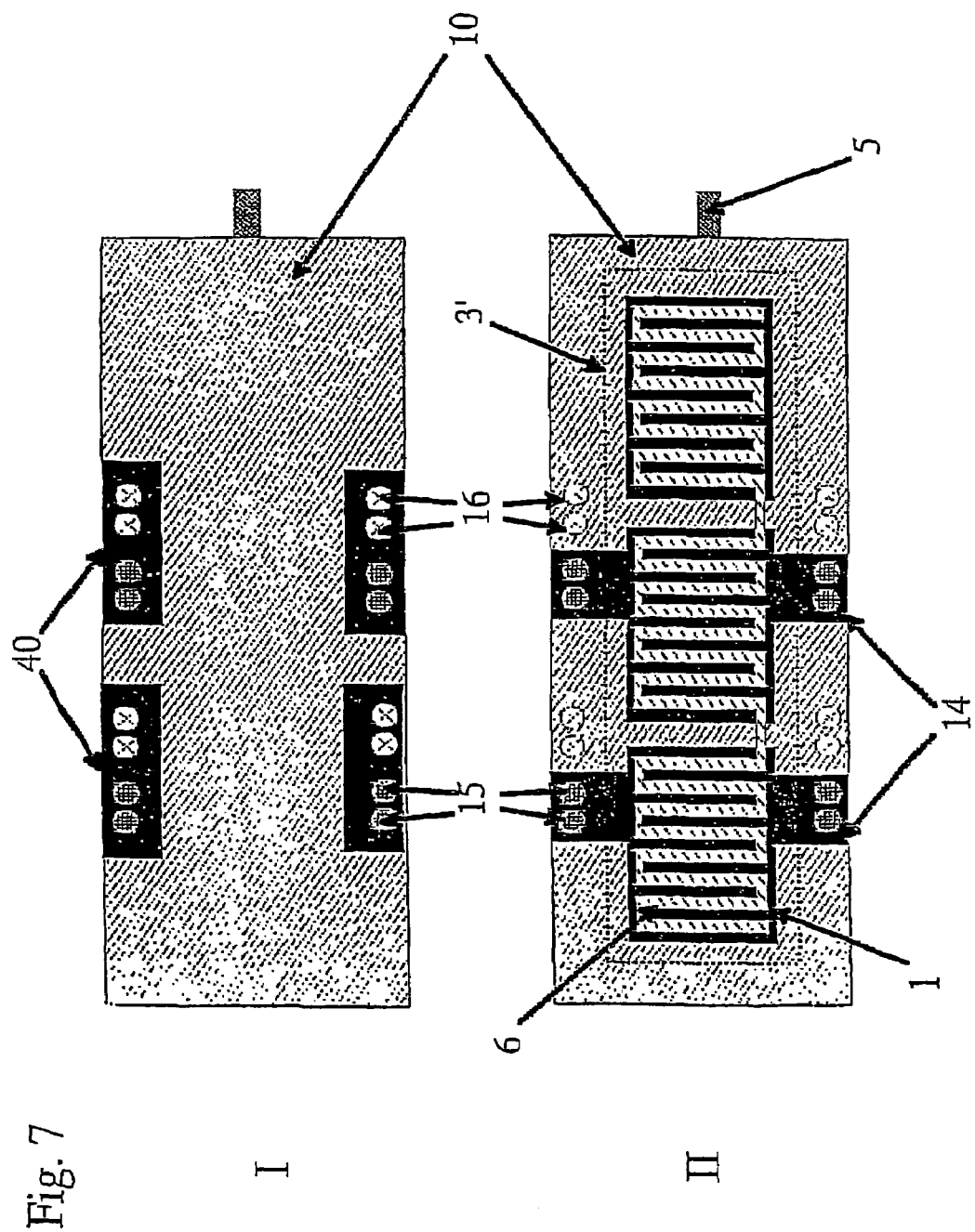

The FIGS. 6 and 7 show a second embodiment. Here the inner-lying connecting lugs 14 and 14' of the printed circuit boards 10 and 11 are shown similarly to that in FIGS. 4 and 5, but the inner-lying connecting lugs 14 and 14' (see FIG. 7) only form an extension of the current collectors to the outer region and no longer have the lateral extension bent at an angle, in the direction of the adjacent fuel cell of the connecting lugs 8 and 8' of FIGS. 4 and 5.

The particularity of this variant of the electrical circuiting of the fuel cells in series in a plane lies in the fact that by way of inner-lying connecting lugs 14 and 14', in each case at least one electrical connection 15 to the outer-lying contacts 40 is created, wherein the outer-lying strip conductors 40 are arranged such that—analogously to the connecting lugs 8 and 8'—the outer lying circuiting strip conductors 40 in each case of two fuel cells overlap as shown in FIG. 6 and are connected to one another by way of one or more perpendicular contacting elements 16. The basic integral homogeneity of the inner-lying connecting lugs 14 and the outer lying strip conductors for circuiting 40 becomes particularly evident from FIG. 7. In this embodiment form the inner-lying connecting lugs 14 as well as the outer-lying strip conductors 40 are electrically contacted for the series connection, wherein the electrical connection is realised in principle in the same manner as in the FIGS. 4 and 5.

Figure 8:
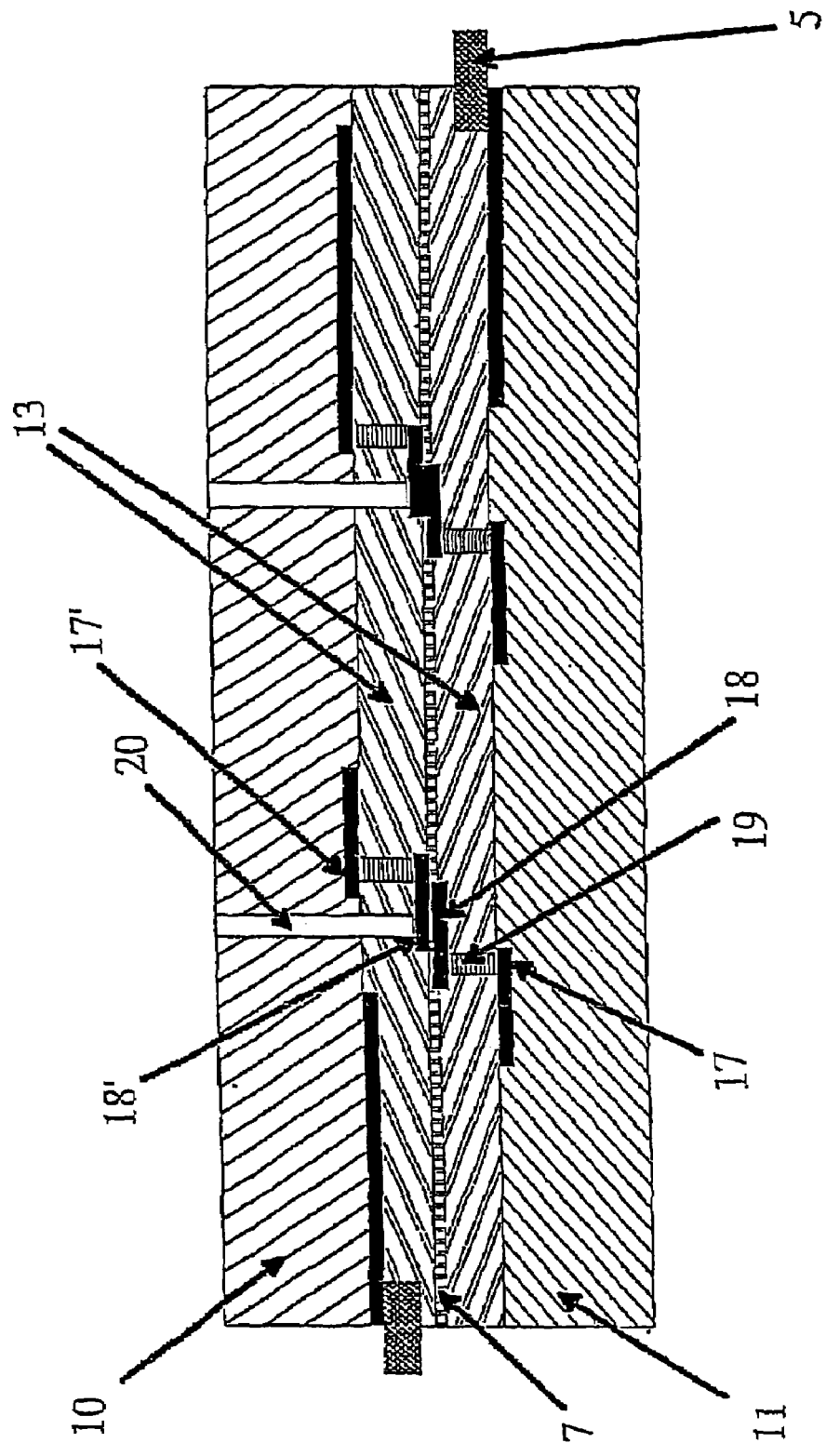
Figure 9:
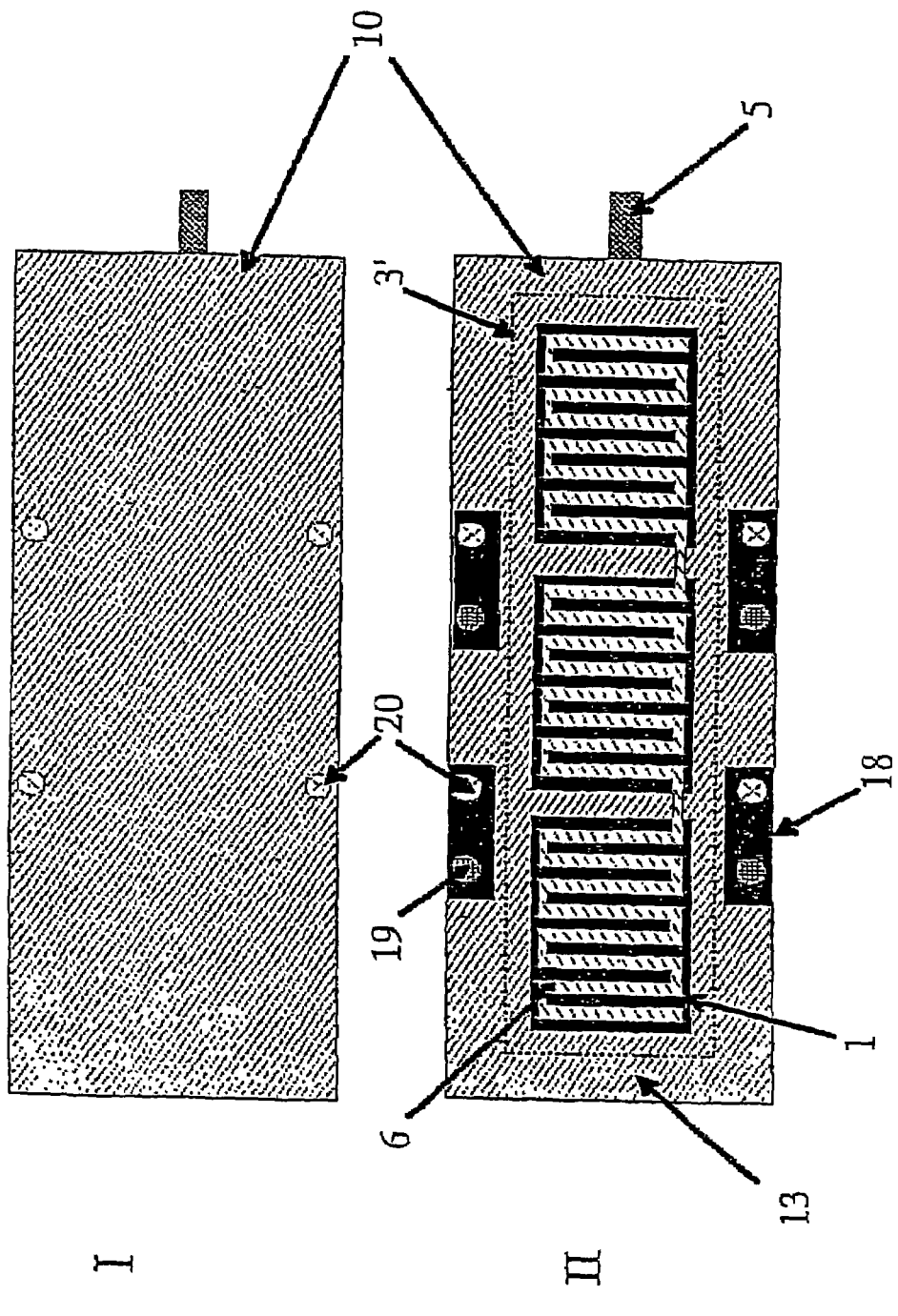

FIGS. 8 and 9 show a third embodiment form. Here the inner-lying connecting lugs 17 and 17' of the printed circuit boards 10 and 11, in each case by way of a perpendicular contacting element 19, are electrically connected to the strip conductors 18 and 18' of the anode-side and cathode-side printed circuit board, said strip conductors facing one another. The strip conductors 18 and 18' which on the reaction region side face one another, thus lie opposite one another, only have a slight distance to one another or form a border surface. By way of the bore, the inner-side strip conductors 18 and 18' lying opposite one another, at a location at which this strip conductors lie opposite one another, are accessible from the outside and may be permanently electrically contacted by way of point welding or laser welding.

Figure 10:
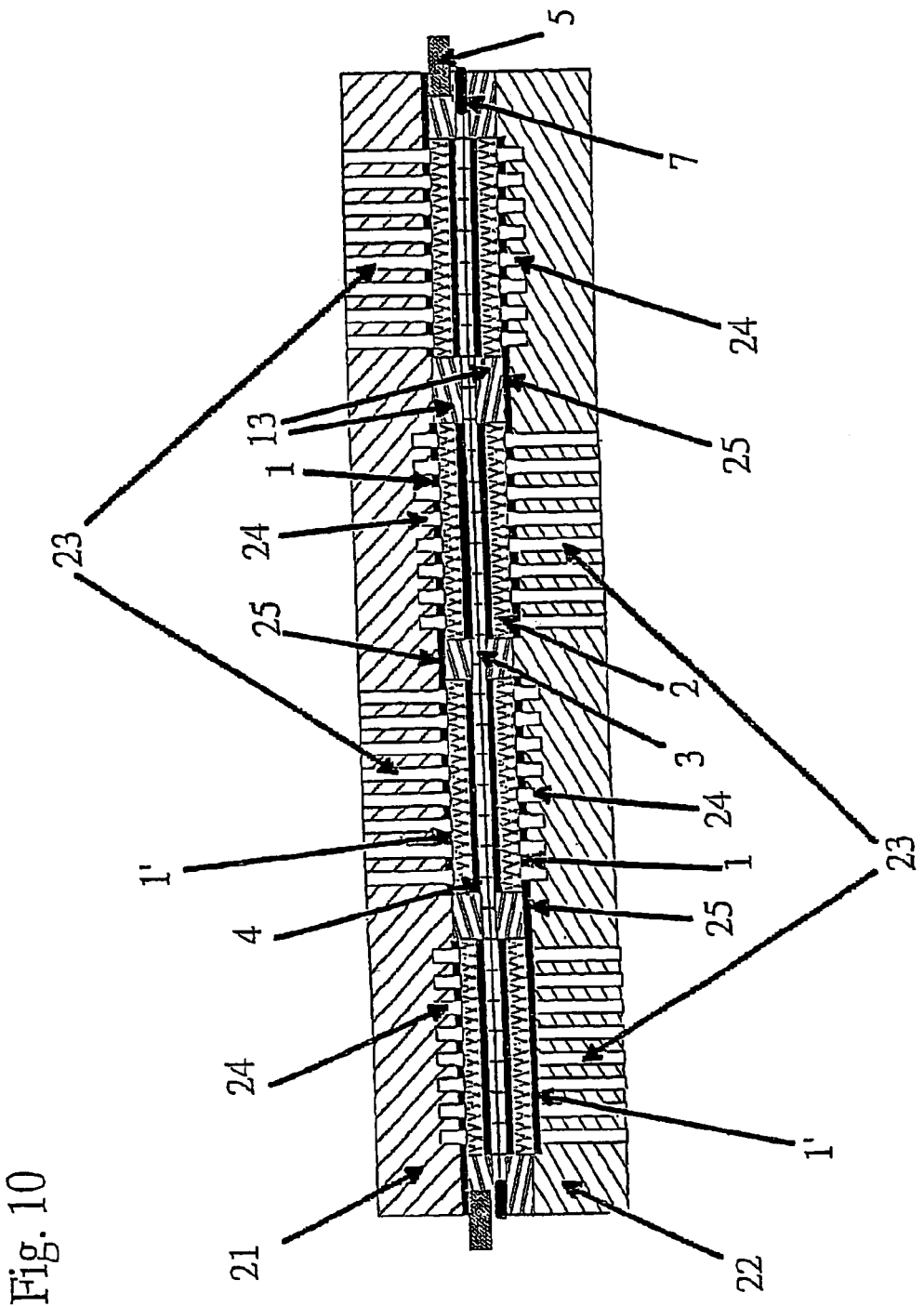

FIG. 10 shows the cross section through the reaction space of a further embodiment, wherein anode gas distributor structures 24 and cathode gas distributor structures 23 are arranged in an alternating manner on each of the printed circuit boards 21 and 22, wherein the current collector 1' of the cathode gas distributor is electrically connected to the adjacent current collector 1 of the anode gas distributor via a strip conductor 25.

In this example, the cathode gas distribution structure 23 is represented with air openings to the outside of the fuel cell system. Instead of air openings, one may also use a closed gas distribution structure 24 such as that of the anode gas distributor 24.

The particular preference of this embodiment lies in the fact that by way of the alternating arrangement of the anode-sides and cathode-sides of the fuel cells, one may do without a contacting of the one side onto the other side of the printed circuit board composite. The fuel cell in the printed circuit board composite may thus be realised merely by way of bringing the two printed circuit boards 21 and 22 onto one another, which is not so tricky with regard to design, and is inexpensive to manufacture.

A fuel cell system according to the invention, with a height of 2 mm to 3 mm has only a very low constructional height. Due to the flat geometry of such a fuel cell system it is particularly suitable for integration into the outer housing of an apparatus. In particular with the construction manner with a cathode which is open to the outside or corresponding openings to the outside for the supply of air, one may operate such a fuel cell system in a self-breathing and passive manner without having to convectively supply oxygen such as by way of a ventilator.

With printed circuit board technology, it is possible to provide a manufacturing technique which is compatible with series production and is reliable for manufacturing fuel cell systems with a relative low electrical output in large batch numbers in an inexpensive and technically less complicated manner. In particular, the electrical series connection, i.e. the contacting of fuel cell to fuel cell of the fuel cell system may be realised by way of a tried and tested industrial method.

It is furthermore very advantageous that due to the design as a printed circuit board composite, electronic circuits may be constructed on the fuel cell system in a simpler manner. Such circuits on the one hand may detect, control or improve the behaviour of the fuel cell system and on the other hand however the consumer to be supplied may also be deposited directly onto the printed circuit board composite. As examples of the first mentioned electronic circuits the following are to be named: electronics for DC-DC conversion, electronics which may be equipped with sensors, for measuring and detecting operating parameters of individual fuel cells current, voltage, impedance, temperature etc.) electronics for controlling the flows of reactands (activation of microvalves or micropumps), electronics for the protection of individual fuel cells by way of protective or bypass diodes, or electronics for bridging individual fuel cells which are no longer capable of functioning.

One example of a consumer to be supplied directly on the printed circuit board in the form of a microelectronic circuit is e.g. a sensor which is supplied electrically in a direct manner by way of the fuel cell system.

The invention claimed is:

1. A planar fuel cell system comprising at least two fuel cells which are electrically connected in series in a plane via horizontally overlapping connecting lugs and comprise an anode current collector on the anode side and comprise a cathode current collector on the cathode side, the current collectors being electrically connected to the connecting lugs, and a polymer electrolyte membrane, wherein the current path is led around the polymer electrolyte membrane, wherein the fuel cell system is designed with a printed circuit board technique and as a composite of a first, anode-side printed circuit board and a second, cathode-side printed circuit board, and the current collectors and connecting lugs are designed as strip conductors of these printed circuit boards.

2. A fuel cell system according to claim 1, wherein the connecting lugs are located within the boundary of the printed circuit board composite.

3. A fuel cell system according to claim 1, wherein the connecting lugs in their overlapping region in each case are connected by way of at least one perpendicular contacting element.

4. A fuel cell system according to claim 3, wherein at least one perpendicular contacting element is a bore filled with an electrically conductive material.

5. A fuel cell system according to claim 4, wherein the electrically conductive material is solder or an electrically conductive adhesive.

6. A fuel cell system according to claim 4, wherein the bore is metallised on its inner side.

7. A fuel cell system according to claim 3, wherein at least one perpendicular contacting element is a rivet.

8. A fuel cell system according to claim 1, wherein gas distribution structures are incorporated into the first, anode-side printed circuit board.

9. A fuel cell system according to claim 1, wherein gas distribution structures are incorporated into the second, cathode-side printed circuit board.

10. A fuel cell system according to claim 1, wherein air openings to the outside are incorporated into the second, cathode-side printed circuit board.

11. A fuel cell system according to claim 1, wherein the fuel cells in each case have a reaction region which is incorporated into the first and second printed circuit boards and which is circumscribed by a raised part of printed circuit board material and/or lacquer.

12. A fuel cell system according to claim 1, wherein the reaction region contains a gas distribution structure and one of the anode or cathode current collectors, and a diffusion layer is provided which is deposited onto one of the anode or cathode current collectors in a flat manner.

13. A fuel cell system according to claim 1, wherein the diffusion layer is designed as a plastic fabric provided with metallised segments.

14. A fuel cell system according to claim 1, wherein the strip conductors and/or outer contacts contained in the fuel cell system are coated with single-ply or multi-ply electrically conductive layers to avoid corrosion.

15. A fuel cell system according to claim 1, wherein the polymer electrolyte membrane is designed as a segmented membrane electrode assembly (MEA).

16. A fuel cell system according to claim 1, wherein on the surface of the printed circuit board composite it comprises an electronic circuit.

17. A fuel cell system according to claim 1, wherein the connecting lugs are arranged in each case on the reaction region side of the first and of the second printed circuit board and are electrically contacted in a permanent manner by way of a welding connection.

18. A planar fuel cell system comprising at least two fuel cells which via strip conductors are electrically connected in series in a plane and which comprise current collectors electrically connected to the connection elements, and a polymer electrolyte membrane, wherein the current path is led around the polymer electrolyte membrane, wherein the fuel cell system is designed in a printed circuit board technique and as a composite of a first printed circuit board and a second printed circuit board, and the current collectors and connection elements are designed as strip conductors of these printed circuit boards, wherein the printed circuit boards in each case comprise alternating anode and cathode gas distribution structures and wherein in each case one adjacent anode current collector and cathode current collector is electrically connected by way of the connection element.

19. A method for manufacturing a fuel cell system according to claim 1, wherein a first and a second printed circuit board carrier is selected, each comprising an upper side and a lower side, and on the upper side of both carriers the steps of:

depositing the metallisation onto the printed circuit board carrier so that a printed circuit board arises, wherein metal films or thin sheets of a material selected from a group consisting of copper, nickel, gold, titanium or stainless steel and/or an alloy thereof is laminated onto the printed circuit board material, or the metallisation is realised by way of coating and a subsequent galvanic reinforcement of the layer;

selective etching-away or milling of the metallisation so that strip conductors arise which in a reaction region form current collectors and connecting lugs, which border the current collectors in a smooth manner;

incorporating gas distribution structures into the printed circuit board;

depositing a diffusion layer;

are carried out and subsequently the membrane-electrode-assembly (MEA) is deposited onto the upper side of the first printed circuit board, the first and the second printed circuit board with their upper sides facing one another are joined together and the connecting lugs are connected to one another in a perpendicular manner.

20. A method according to claim 19, wherein as a membrane electrode assembly (MEA) an MEA catalytically coated over its whole surface is selected and is segmented before deposition onto the first printed circuit board.

21. A method according to claim 20, wherein the segmentation of the MEA is incorporated by way of laser ablation and/or reactive ion etching.

22. A method according to claim 19, wherein after the incorporation of the gas distribution structures, a raised part surrounding the reaction regions of the first and second printed circuit board is deposited so that in each case a recess arises in the region of the reaction regions.

* * * * *